(12) United States Patent
Heemskerk

(10) Patent No.: US 9,237,754 B1
(45) Date of Patent: Jan. 19, 2016

(54) APPARATUS AND METHOD FOR CLEANING A POULTRY CARCASS

(71) Applicant: Meyn Food Processing Technology B.V., Oostzaan (NL)

(72) Inventor: Wilhelmus Johannes Casper Heemskerk, Oostzaan (NL)

(73) Assignee: MEYN FOOD PROCESSING TECHNOLOGY B.V., Oostzaan (NL)

( * ) Notice: Subject to any disclaimer, the term of this patent is extended or adjusted under 35 U.S.C. 154(b) by 0 days.

(21) Appl. No.: 14/792,942

(22) Filed: Jul. 7, 2015

(30) Foreign Application Priority Data

Jul. 18, 2014 (NL) .................................... 2013218

(51) Int. Cl.
A22C 21/00 (2006.01)

(52) U.S. Cl.
CPC .......... *A22C 21/0061* (2013.01); *A22C 21/0053* (2013.01)

(58) Field of Classification Search
USPC ...................... 452/81–83, 119, 120, 123, 173
See application file for complete search history.

(56) References Cited

U.S. PATENT DOCUMENTS

| | | | |
|---|---|---|---|
| 2,115,026 A | 4/1938 | Kranzfelder | |
| 2,350,656 A | 6/1944 | Williamson | |
| 2,627,627 A | 2/1953 | McDougall | |
| 3,596,309 A * | 8/1971 | Vertegaal | A22C 21/022 452/89 |
| 3,599,278 A * | 8/1971 | Crane | A22C 21/022 452/89 |
| 3,858,715 A | 1/1975 | Brock | |
| 5,178,578 A * | 1/1993 | Simmons | A22C 21/06 452/116 |
| 5,197,916 A * | 3/1993 | Orlando | A22C 25/17 452/125 |
| 5,538,467 A * | 7/1996 | Wodajo | A22C 25/145 15/164 |
| 5,605,503 A * | 2/1997 | Martin | A22C 21/0061 452/173 |
| 6,213,864 B1 | 4/2001 | Griffiths | |
| 6,733,379 B2 * | 5/2004 | Tsang | A22C 17/08 452/173 |
| 6,918,825 B2 * | 7/2005 | Conaway | A22C 21/02 452/88 |
| 7,381,124 B1 * | 6/2008 | Hahn | A22B 5/08 452/97 |
| 8,986,079 B2 * | 3/2015 | Remmer | A22C 21/022 452/86 |
| 9,039,497 B1 * | 5/2015 | Guidry | A22C 21/022 452/88 |

FOREIGN PATENT DOCUMENTS

GB 337379 A 4/1930

* cited by examiner

*Primary Examiner* — Richard Price, Jr.
(74) *Attorney, Agent, or Firm* — Dority & Manning, P.A.

(57) ABSTRACT

An apparatus and method for cleaning a poultry carcass. In one exemplary aspect, a conveyor is applied for conveying the carcass along a track and brush device is positioned next to the track for brushing the carcass exterior, wherein the device is embodied with at least one rotatable drum, and to which drum brush hairs are connected, such that opposite ends of the brush hairs are connected to the drum so as to arrange that the brush hairs form a closed loop with the drum.

24 Claims, 4 Drawing Sheets

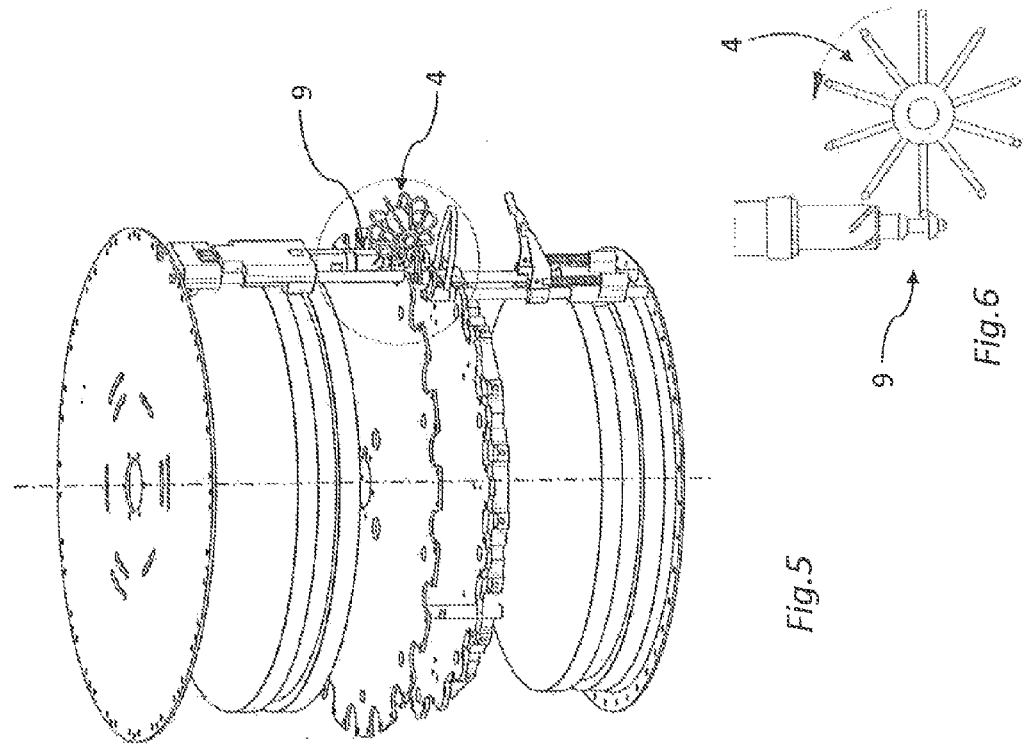
Fig.5
Fig.6
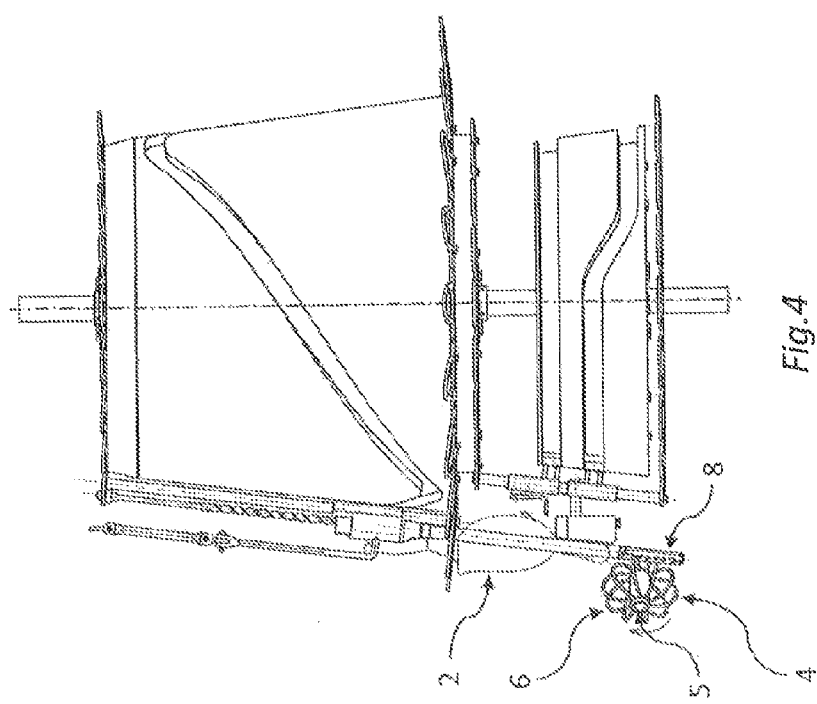
Fig.4

APPARATUS AND METHOD FOR CLEANING A POULTRY CARCASS

PRIORITY STATEMENT

The present application claims priority under 35 U.S.C. §119 to Dutch Application No. 2013218, filed Jul. 18, 2014.

FIELD OF THE INVENTION

The subject matter of the present disclosure relates generally to an apparatus for cleaning a poultry carcass.

BACKGROUND OF THE INVENTION

A conventional method and apparatus for cleaning a poultry carcass are known from EP-A-1 538 917. In the known method and apparatus, brushing of the poultry carcasses is done after the carcasses are defeathered and eviscerated. This however does not provide a solution to the problem that the poultry carcasses also require cleaning prior to their being processed to prepare for defeathering and evisceration in order to avoid contamination of the water used during the scalding process that precedes defeathering.

A live chicken collects litter and feces at the farm, particularly at biological farms. This litter and feces attaches to the chickens in the form of lumps and is of course required to be removed prior to processing the live chickens to chicken parts or to—except for cooking ready-to-eat meat—to avoid unsanitary conditions which may be detrimental to a person's health.

Despite its lack of imagination, the skilled person bearing knowledge of EP-A-1 538 917 may perhaps consider to brush the poultry at an early stage of its processing while it is still feathered. A problem is, however, that the longhaired bristles of the known apparatus are not equipped to remove the lumps of litter and feces, since during operation the bristles follow a more or less straight line along the poultry carcasses' exteriors without effectively coming into contact with those lumps for their removal.

Another problem of the prior art method and apparatus is that the brush means may deteriorate the outer appearance of the chickens due to scratching.

It is therefore an object of the invention to provide a method and apparatus with which an effective cleaning of the outside of poultry carcasses can be carried out while the carcasses still bear feathers.

Another object of the invention is to provide such a method and apparatus wherein the cleaning of the poultry exterior does not adversely affect the visual appearance of the poultry.

According to the invention a method and apparatus are therefore proposed having the features of one or more of the appended claims.

SUMMARY OF THE INVENTION

Aspects and advantages of the invention will be set forth in part in the following description, or may be obvious from the description, or may be learned through practice of the invention.

In one exemplary embodiment, the present invention provides an apparatus including a conveyor for conveying the carcass along a track and brush means positioned next to the track for brushing the carcass exterior, wherein the brush means are embodied with at least one rotatable drum, to which drum brush hairs are connected. The invention further relates to a method for cleaning a poultry carcass which is being conveyed along a track, wherein the cleaning is carried out by brushing the carcass exterior with brush means that are embodied with at least one rotatable drum to which brush hairs are connected.

According to a first exemplary aspect of the invention, opposite ends of the brush hairs are connected to the drum so as to arrange that the brush hairs form a closed loop with the drum. By connecting opposite ends of the brush hairs to the drum wherein each of the brush hairs forms a closed loop with the drum, it is possible that during rotation of the drum each closed loop can catch and remove a lump of litter and feces from the poultry carcass' exterior.

In order to process the poultry carcasses at a high rate, in one exemplary embodiment it is preferred that the conveyor is a suspension conveyor for suspending the poultry carcasses by the legs.

In accordance with the object of the invention, in one exemplary embodiment it is preferred that the conveyor is arranged for conveying poultry carcasses in a processing line prior to defeathering so as to arrange that the poultry can be brushed prior to defeathering. It is however also possible to apply the apparatus of the invention after defeathering.

In one exemplary embodiment, it is preferred that during operation rotation of the drum causes the closed loops of brush hairs to move or swipe past at least a part of the poultry carcass' exterior and in accordance with the direction of the poultry's feathers. The removal of the lumps of litter and feces is best promoted by having the closed loops of brush hairs move or swipe past the poultry carcass' exterior in accordance with the direction of the poultry's feathers.

The cleaning operation is best promoted by providing the at least one rotatable drum with a longitudinal body axis that is placed predominantly parallel to the track. This is particularly beneficial in the process of cleaning the region of the poultry's vent. It may then also be beneficial that the apparatus has means to tilt the poultry that is suspended by the legs, during the cleaning of the region of the poultry's vent.

In another aspect of the invention the at least one rotatable drum has multiple brush hairs, and the brush hairs are connected to the drum wherein each brush hair forms a closed loop with the drum and wherein the connections of the brush hairs with the drum are randomly distributed over the drum's outer circumference. This arrangement is very beneficial to achieve a very high efficiency in collecting and removing as many of the lumps of litter and feces which may be positioned at very diverse places at the poultry carcass' exterior.

For the same reason it may also be beneficial that there are brush hairs having a variable thickness along the length of such hairs. The variety in thickness provides a variation in aggressiveness at which the hairs operate on the poultry carcass' exterior, and this has proven beneficial for the efficiency of removing the lumps of litter and feces. In this connection it may also be beneficial that there are brush hairs provided with beads.

Other suitable variations of the apparatus and method of the invention is that the at least one rotatable drum has during operation a variable rotational speed. Particularly when the loops have different lengths, variation in the rotational speed of the drum will cause that the loops will have a variable contact length with the poultry's carcass exterior. This has proven effective in increasing the efficiency of removing the lumps of litter and feces. And when the apparatus is provided with multiple drums, it has proven effective that the multiple drums rotate during operation with mutually different rotational speeds.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 4 shows a method of cleaning a cropper;

FIG. 5 and FIG. 6 show a method of cleaning a vent cutter; and

The use of identical or similar reference numerals in different figures denotes identical or similar features.

DETAILED DESCRIPTION OF THE INVENTION

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

Figure 1:
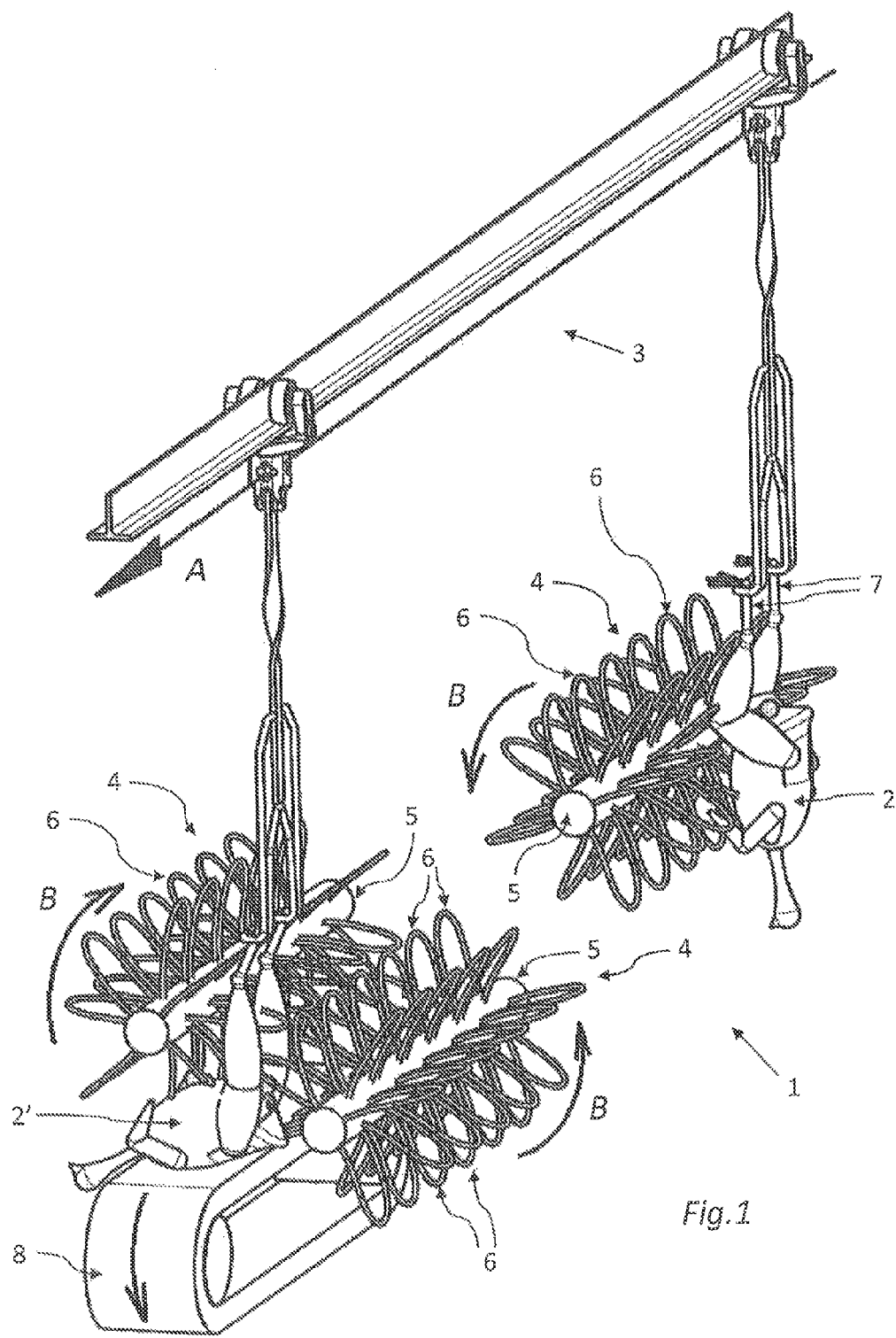
FIG. 1 schematically illustrate an exemplary apparatus according to the invention in an isometric view.
Figure 2:
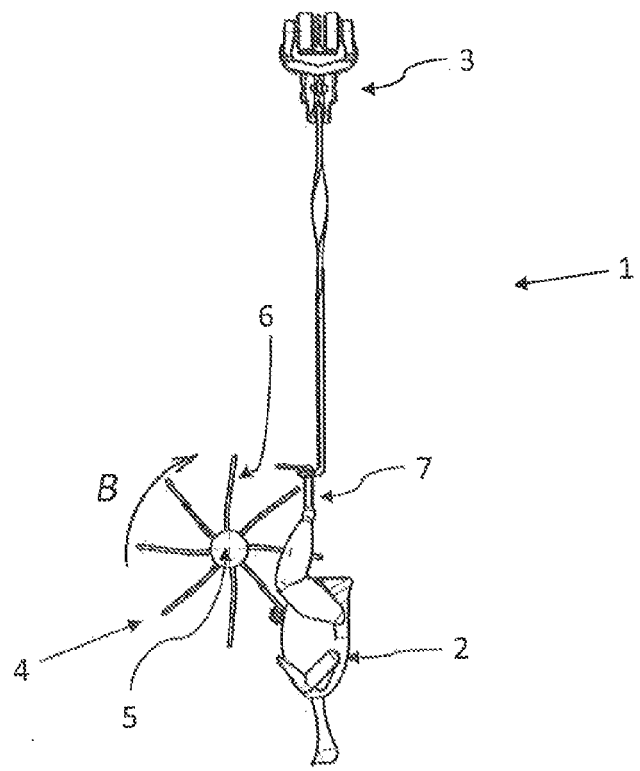
FIG. 2 shows in a frontal view the apparatus according to FIG. 1.
Figure 3:
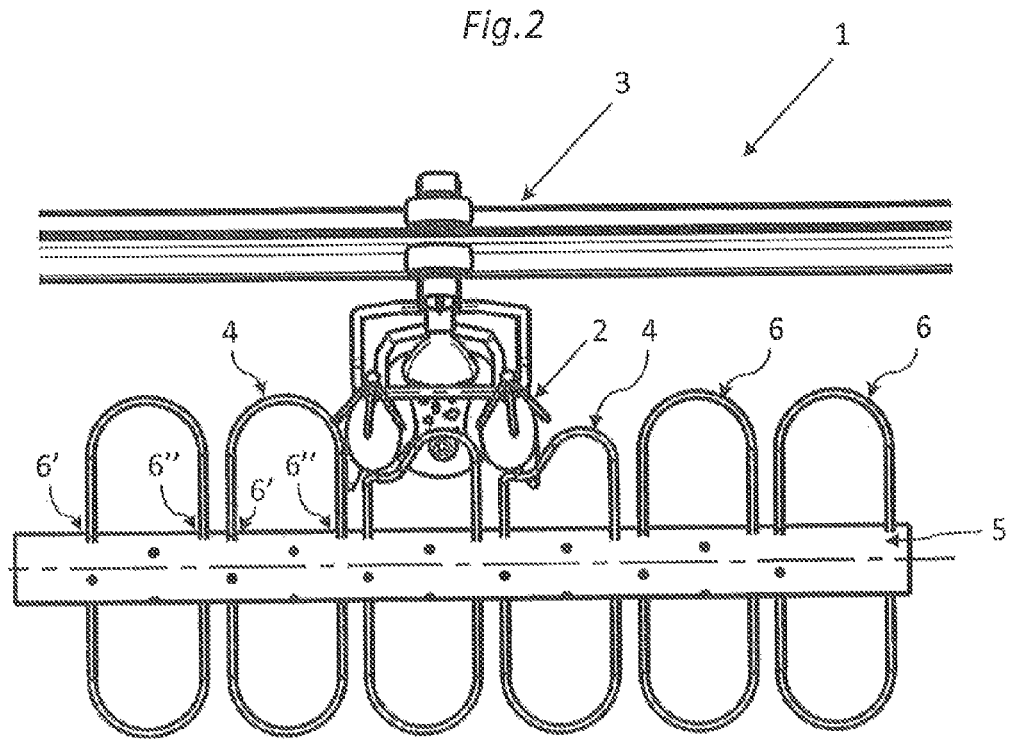
FIG. 3 shows in a top view the apparatus according to FIG. 1.

Making first reference to FIGS. 1, 2 and 3, an exemplary apparatus 1 is shown for cleaning a poultry carcass 2, 2'. For clarity purposes the poultry carcass 2, 2' is shown without feathers although it should be well understood that the invention relates to a method and apparatus which is in particular used for brushing the poultry at an early stage of its processing while it is still feathered. Correspondingly the poultry is suspended in a conveyor 3 which is arranged for conveying the poultry carcasses 2, 2' in a processing line prior to defeathering.

FIG. 1 shows two options; notably brushing the exterior of a poultry carcass 2 and brushing the exterior of a poultry carcass 2' near the vent.

The conveyor 3 is arranged for conveying the poultry carcasses 2, 2' along a track symbolized with arrow A. The exemplary apparatus 1 of the invention has brush means 4 positioned next to the track A for brushing the carcass 2, 2' exterior. The brush means 4 are embodied with at least one rotatable drum 5, to which drum 5 brush hairs 6 are connected, wherein opposite ends 6', 6" of the brush hairs 6 (as is best shown in FIG. 3) are connected to the drum 5 so as to arrange that the brush hairs 6 form a closed loop with the drum 5. FIGS. 1, 2 and 3 further show that the rotatable drum 5 to which the hairs 6 are connected has a longitudinal body axis which is predominantly parallel to the track A.

To secure a high processing rate it is preferable that the conveyor 3 is a suspension conveyor for suspending the poultry carcasses 2, 2' by the legs. Suspending the poultry carcasses by the legs 2, 2' applies both to a regular cleaning of the exterior of a poultry carcass 2, as to the cleaning of a poultry carcass 2' near its vent. In the latter situation FIG. 1 shows the preferable arrangement that the apparatus 1 is provided with means 8 to tilt the poultry carcass 2' while being suspended by the legs, during cleaning of the region of the poultry's vent. Suitably these means 8 for tilting the poultry can be embodied as a conveyor belt.

Regarding the construction of the hairs 6 that are to the drum 5 or drums, the following can be remarked.

Figure 7:
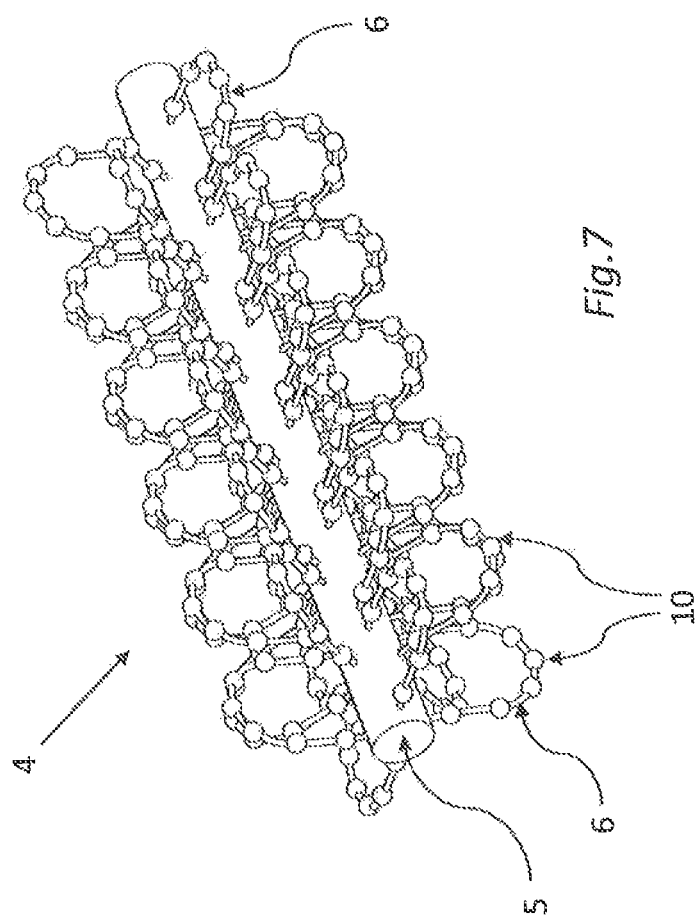
FIG. 7 shows an embodiment of the exemplary apparatus of the invention wherein the brush hairs are provided with beads.

As is clearly shown in FIGS. 1 and 3, the at least one rotatable drum 5 has multiple brush hairs 6, wherein the brush hairs 6 are connected to the drum 5 to arrange that each brush hair 6 forms a closed loop with the drum 5. For clarity purposes the hairs 6 are all depicted with the same thickness in the hairs are uniformly distributed along the outer circumference of the drum 5. It is, however, also possible and at times preferable to promote effective cleaning that the connections 6', 6" of the brush hairs 6 with the drum 5 are randomly distributed over the drum's outer circumference. Further it may for the same purpose be preferable that there are brush hairs 6 having a variable thickness along the length of such hairs 6. It is also possible to provide (at least some of) the brush hairs 6 with beads 10 as is shown in FIG. 7.

FIG. 1 shows that the apparatus 1 may be provided with several drums 5. These multiple drums can during operation be rotated with the same rotational speed. However, it may for effective cleaning be beneficial that the multiple drums rotate during operation with mutually different rotational speeds. Even if the apparatus of the invention is embodied with a single drum 5, it may be beneficial that this drum 5 has during operation a variable rotational speed.

Whilst the apparatus 1 is in operation rotation of the drum 5 or drums causes the closed loops of brush hairs 6 to move or swipe past at least a part of the exterior of the poultry carcasses 2, 2'. This is clear from FIG. 3, which also shows that during rotation of the drums 5 the hairs 6 adjust to the curvature of the poultry exterior. The direction of rotation of the drums 5 is indicated with arrows B in FIGS. 1 and 2, and is preferably selected in accordance with the direction of the poultry's feathers.

Although the exemplary apparatus 1 of the invention is particularly suited to implement a method of cleaning the poultry carcasses 2, 2' exterior, the invention is not restricted thereto. The invention is also embodied in an exemplary method for cleaning a poultry processing machine with brush means 4 that are in the same way as discussed hereinabove with reference to FIGS. 1, 2 and 3, embodied with at least one rotatable drum 5 to which brush hairs 6 are connected, wherein opposite ends 6', 6" of the brush hairs 6 are connected to the drum 5 so as to arrange that each of the brush hairs 6 forms a closed loop with the drum 5. FIGS. 4, 5 and 6 relate to such a method of cleaning a poultry processing machine. For clarity purposes such FIGS. 4, 5 and 6 show only the brush means 4 when operating on a cropper 8 (FIG. 4) and when operating on a vent cutter 9 (FIG. 5 and in a detail view FIG. 6).

Although the invention has been discussed in the foregoing with reference to an exemplary embodiment of the apparatus and method of the invention, the invention is not restricted to this particular embodiment which can be varied in many ways without departing from the gist of the invention. The discussed exemplary embodiment shall therefore not be used to construe the appended claims strictly in accordance therewith. On the contrary the discussed embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

What is claimed is:

1. An apparatus for cleaning a poultry carcass, the apparatus comprising:
a conveyor for conveying the carcass along a track;
brush means positioned next to the track for brushing the carcass exterior, wherein the brush means are embodied with at least one rotatable drum, to which drum brush hairs are connected, and wherein opposite ends of the brush hairs are connected to the drum so as to arrange that the brush hairs form a closed loop with the drum.

2. The apparatus for cleaning a poultry carcass as in claim 1, wherein the conveyor comprises a suspension conveyor for suspending the poultry carcasses by the legs.

3. The apparatus for cleaning a poultry carcass as in claim 1, wherein the conveyor is arranged for conveying poultry carcasses in a processing line prior to defeathering.

4. The apparatus for cleaning a poultry carcass as in claim 1, wherein during operation rotation of the drum causes the closed loops of brush hairs to move or swipe past at least a part of the poultry carcass' exterior and in accordance with the direction of the poultry's feathers.

5. The apparatus for cleaning a poultry carcass as in claim 1, wherein the at least one rotatable drum has a longitudinal body axis which is predominantly parallel to the track.

6. The apparatus for cleaning a poultry carcass as in claim 1, further comprising means to tilt the poultry while being suspended by the legs during cleaning of the region of a vent of the poultry.

7. The apparatus for cleaning a poultry carcass as in claim 1, wherein the at least one rotatable drum comprises multiple brush hairs and the brush hairs are connected to the drum, wherein each brush hair forms a closed loop with the drum and wherein the connections of the brush hairs with the drum are randomly distributed over the drum's outer circumference.

8. The apparatus for cleaning a poultry carcass as in claim 1, further comprising brush hairs having a variable thickness along a length of such hairs.

9. The apparatus for cleaning a poultry carcass as in claim 1, further comprising brush hairs that are provided with beads.

10. The apparatus for cleaning a poultry carcass as in claim 1, wherein the at least one rotatable drum has during operation a variable rotational speed.

11. The apparatus for cleaning a poultry carcass as in claim 1, further comprising multiple drums that rotate during operation with mutually different rotational speeds.

12. A method for cleaning a poultry carcass with a poultry processing machine having brush means that include at least one rotatable drum to which brush hairs are connected, the method comprising the steps of:
connecting opposite ends of the brush hairs to the drum so as to arrange that each of the brush hairs forms a closed loop with the drum.

13. The method for cleaning a poultry carcass with a poultry processing machine as in claim 12, further comprising the steps of:
conveying the poultry carcass along a track; and
brushing the carcass exterior using the brush means.

14. The method for cleaning a poultry carcass with a poultry processing machine as in claim 13, further comprising the steps of suspending the poultry by the legs while the poultry is being conveyed.

15. The method for cleaning a poultry carcass with a poultry processing machine as in claim 13, wherein the brushing occurs prior to defeathering.

16. The method for cleaning a poultry carcass with a poultry processing machine as in claim 13, further comprising moving or swiping the closed loops of the brush hairs past at least a part of the poultry carcass' exterior and in accordance with the direction of the poultry's feathers.

17. The method for cleaning a poultry carcass with a poultry processing machine as in claim 12, wherein the at least one rotatable drum has a longitudinal body axis which is placed predominantly parallel to the track.

18. The method for cleaning a poultry carcass with a poultry processing machine as in claim 12, further comprising the step of tilting the poultry while the poultry is being suspended by the legs and during cleaning the region of the poultry's vent.

19. The method for cleaning a poultry carcass with a poultry processing machine as in claim 12, wherein the at least one rotatable drum comprises multiple brush hairs, and further comprising the steps of:
connecting the brush hairs to the drum such that each brush hair forms a closed loop with the drum; and
providing the connections of the brush hairs with the drum at randomly distributed positions over the drum's outer circumference.

20. The method for cleaning a poultry carcass with a poultry processing machine as in claim 19, wherein the brush hairs are provided with a variable thickness along the length of such hairs.

21. The method for cleaning a poultry carcass with a poultry processing machine as in claim 20, wherein the brush hairs are provided with beads.

22. The method for cleaning a poultry carcass with a poultry processing machine as in claim 21, wherein the at least one rotatable drum is operated at a variable rotational speed.

23. The method for cleaning a poultry carcass with a poultry processing machine as in claim 22, wherein the poultry processing machine includes multiple drums that are rotated with mutually different rotational speeds.

24. The method for cleaning a poultry carcass with a poultry processing machine as in claim 12, wherein poultry processing machine is selected from the group comprising a cropper and a vent cutter.

* * * * *